United States Patent [19]
McCarthy

[11] 3,878,922
[45] Apr. 22, 1975

[54] BRAKE STRUCTURE
[75] Inventor: Richard H. McCarthy, West Allis, Wis.
[73] Assignee: FMC Corporation, San Jose, Calif.
[22] Filed: Nov. 9, 1973
[21] Appl. No.: 414,548

[52] U.S. Cl................................ 188/163; 188/72.9
[51] Int. Cl............................................. F16d 65/34
[58] Field of Search ....... 188/71.3, 71.5, 72.1, 72.7, 188/72.9, 161, 163, 171

[56] References Cited
UNITED STATES PATENTS

| | | | |
|---|---|---|---|
| 2,775,320 | 12/1956 | Vallen | 188/171 |
| 3,171,515 | 3/1965 | Wolfe | 188/171 |
| 3,322,240 | 5/1967 | Dotto | 188/163 |
| 3,500,971 | 3/1970 | McCarthy | 188/171 |

*Primary Examiner*—Duane A. Reger
*Attorney, Agent, or Firm*—C. E. Tripp

[57] ABSTRACT

An actuating mechanism for an electric brake includes a solenoid which, when energized, acts through a lever system to set the brake against the action of spring which disengages the brake when the solenoid is deenergized.

2 Claims, 4 Drawing Figures

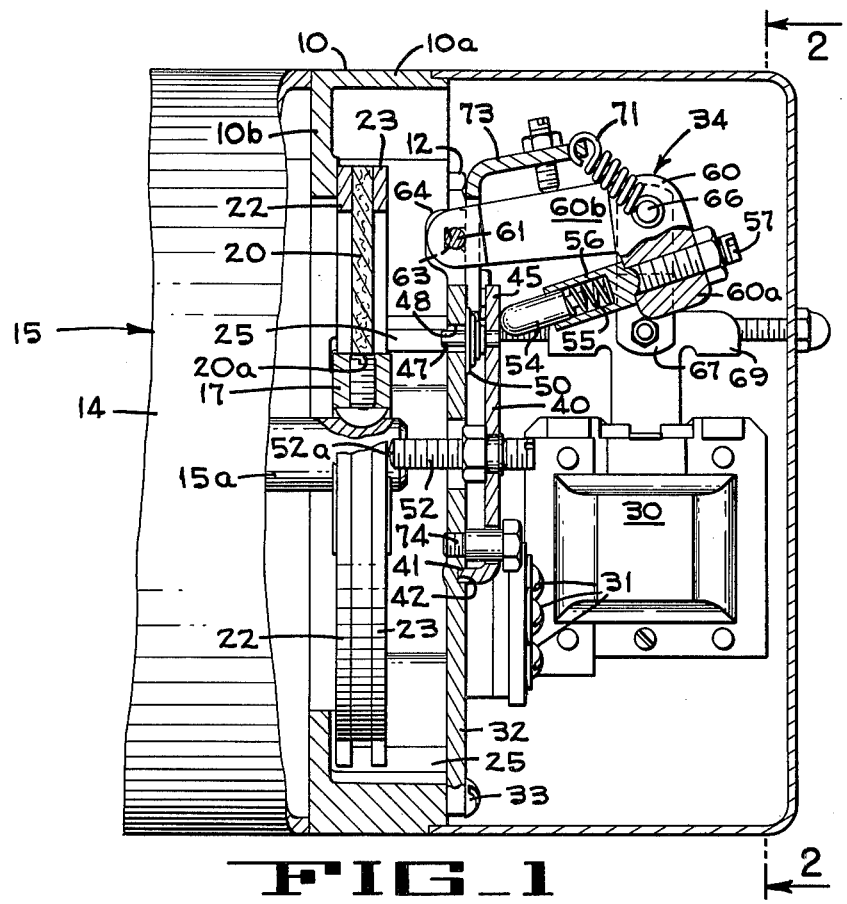
FIG_1
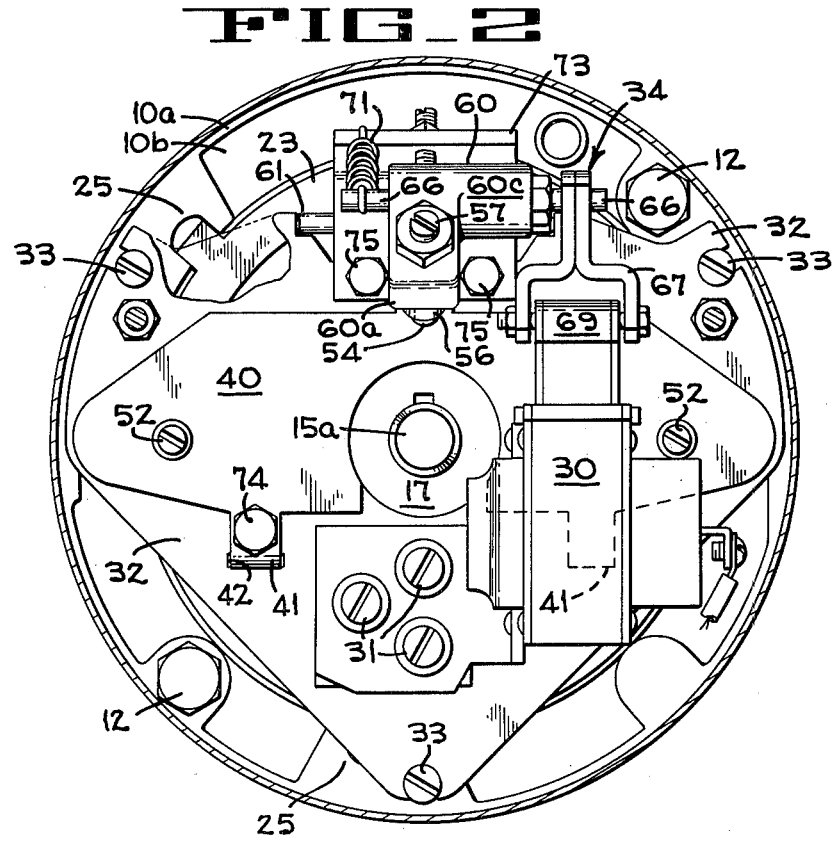
FIG_2

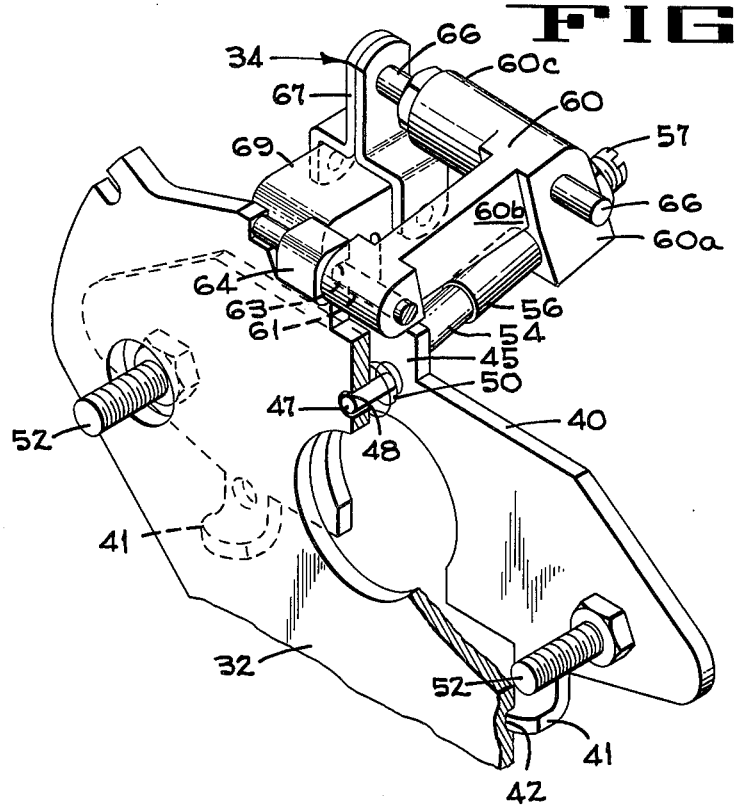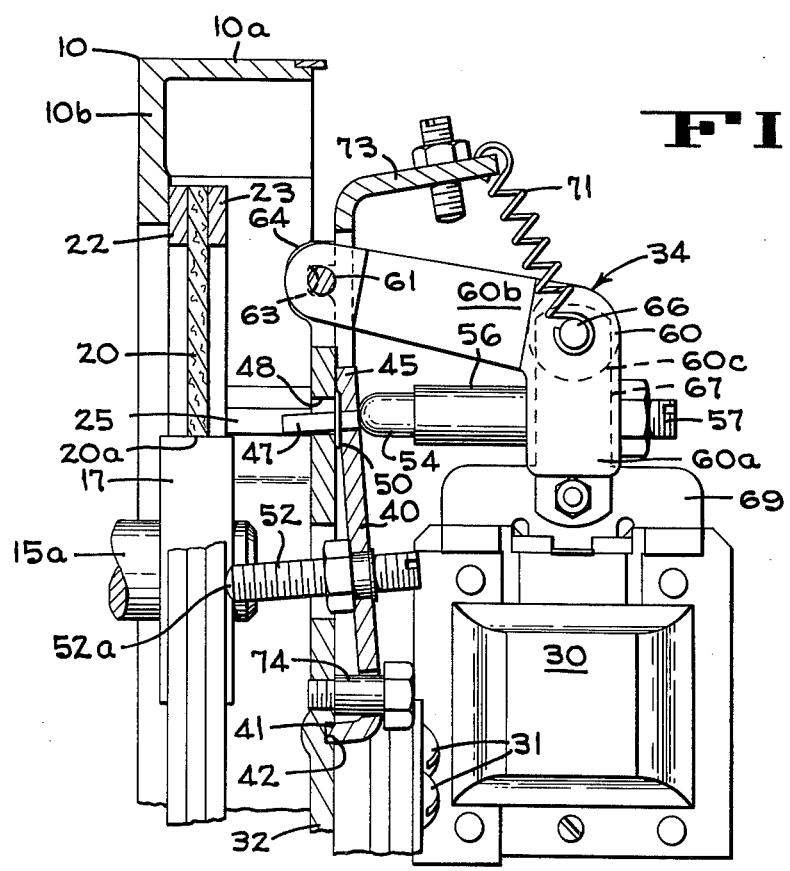

BRAKE STRUCTURE

BACKGROUND OF THE INVENTION

This invention concerns improvements in brakes for electric motors and particularly in mechanisms for applying brakes. In the type of brake with which the present invention is adapted for use, a friction disc is keyed to the motor shaft whose rotation is to be arrested and a pair of friction rings are positioned on opposite sides of the periphery of the disc. An actuating mechanism engages one of the rings and forces it toward the disc to lock the disc between the rings and to urge one ring into locking engagement with a nonrotatable structural member. When the disc and rings are so engaged, the rotation of the motor shaft is stopped.

U. S. Pat. Nos. 2,939,551, 2,964,137, and 3,045,782 disclose such brakes, and each of these brakes features a spring for applying the brake to stop the motor shaft. The use of spring-engaged brakes has not been effective for all types of machinery, however, and a more positive actuating mechanism for this type of brake is particularly needed for certain installations. In accordance with the present invention there is provided a unique actuating mechanism which is effective to lock the disc and friction rings of this type of brake through the positive pull of the plunger of a solenoid.

DESCRIPTION OF THE DRAWINGS

FIG. 1 is a fragmentary side elevation of a motor having a brake mechanism constructed in accordance with the teaching of the present invention, parts being broken away to disclose the brake mechanism.

FIG. 2 is a transverse section taken along lines 2—2 of FIG. 1.

FIG. 3 is a fragmentary perspective of a portion of the brake-applying mechanism of the present invention.

FIG. 4 is an enlarged showing of a portion of FIG. 1.

DESCRIPTION OF THE PREFERRED EMBODIMENT

The brake of the present invention includes an end plate 10 (FIG. 1) which has a generally cylindrical outer flange 10a and a radially-inwardly projecting flange 10b. The plate 10 is secured by a pair of diametrically opposed capscrews 12 (FIG. 2) to an inner wall portion of a housing 14 of an electric motor 15, which has a drive shaft extension 15a projecting from one end of the housing. A hub 17, which is keyed to the shaft 15a, is square in cross-section and adapted to receive on its periphery a friction disc 20 which has a central square aperture 20a. Accordingly, the disc is connected in driven relation with the hub but is capable of axial, sliding movement thereon.

A pair of non-rotatable friction rings 22 and 23 are disposed adjacent the periphery of the rotatable disc 20, one on each side of the disc 20. The rings 22 and 23 are held in substantially centered position in the end plate 10 by a plurality of bosses 25 formed on the inner surface of flange 10a.

The brake includes a solenoid 30 which is mounted by capscrews 31 on a fixed support plate 32. The plate is, in turn, secured by capscrews 33 to the end plate 10. When the solenoid is energized, it acts through a linkage 34 to apply axial pressure to the ring 23, and thereby lock the disc 20 between the rings 22 and 23 and urge the ring 22 against the inwardly extending non-rotatable flange 10b. When the disc 20 is in this locked condition, the drive shaft of the motor is also locked against rotation.

The linkage 34 includes a lever arm 40 in the form of a plate (FIG. 3) having two tabs 41, which are bent at substantially right angles to the plane of the body of the plate. The tabs are pivotally received in sockets 42 (one only being shown in FIG. 4) formed in the support plate 32 and restrained by two shoulder screws 74.

As shown in FIG. 3, at its upper end the lever plate 40 has an upwardly projecting tab 45 and, adjacent the base of the tab 45, a pin 47 is fixed in the plate 40 and projects through a hole 48 in the support plate 32. A conical compression spring 50 (FIG. 1) is disposed around the pin 47 between the support plate 32 and the lever 40 and tends to pivot the lever clockwise (FIG. 4) about their pivot points in the sockets 42 in the support plate. The lever 40 also carries a pair of adjusting studs 52 that have end portions 52a adapted to bear against the ring 23.

The lever 40 is pivoted counterclockwise by a cylindrical, round nose push rod 54 which has one end bearing against the tab 45 and the other end slidably disposed in a socket 56 (FIG. 1) formed in an enlarged cylindrical end of an adjusting screw 57. The push rod 54 is resiliently urged out of the socket by a coil spring 55 and is positioned in the socket, one end of the spring being in abutting engagement with an end wall of the socket and the other end being disposed around a reduced-diameter projection of push rod 54. The screw 57 is threaded in one leg 60a of a bent lever 60, the other leg 60b extending substantially normal to leg 60a and carrying a pin 61. The pin 61 projects to opposite sides of the end of leg 60b, and each projecting end of the pin is received in a socket 63 formed in an upwardly projecting bent arm 64 of the support plate 32. Only one bent arm 64 is shown in FIG. 3 but it will be understood that the second arm is identical to the arm that is shown and is disposed closely adjacent the opposite side of the end of the leg 60b of the lever 60.

The lever 60 has a side extension 60c which carries a pin 66 to which one end of a link 67 is pivotally connected. At its opposite end, the link 67 is pivotally connected to the plunger 69 of the solenoid 30. A spring 71 (FIG. 4) is connected between a portion of the pin 66 which projects from the opposite side of the hub portion of the lever 60, and a bracket 73 secured by capscrews 75 to the fixed support plate 32. It will be seen that the downward movement of the solenoid and the linkage 34 is resisted by the spring 71. Accordingly, when the solenoid is de-energized, the spring 71 will raise the linkage 34 and the plunger.

Referring to FIGS. 3 and 4, it will be seen that, when the solenoid 30 is energized to pull the plunger 69 downwardly, the lever 60 is pivoted clockwise about pin 61 to apply pressure through spring 55 to the lever plate 40. The plate 40 pivots counterclockwise in the two sockets 42 and causes the two pins 52 to move the ring 23 to the left (FIG. 4), applying force to the ring to clamp the friction disc 20 between the non-rotatable rings 22 and 23. As a result, torque is absorbed by the rings and is transferred to the fixed end plate 10, and the shaft 15 is locked against rotation.

When the solenoid is de-energized, the compression spring 55 and the spring 71 pivot the bent lever 60 in a counterclockwise direction (FIG. 1) to raise the solenoid plunger 69. The conical compression spring 50

(FIG. 1) pivots the lever plate 40 clockwise to release the pressure on the rings 22 and 23 and permit the friction disc to rotate.

The amount of force that is applied to the rings 22 and 23 may be varied by adjusting the screw 57 relative to the bent lever 60.

From the foregoing description it will be seen that the present invention provides an effective mechanism for engaging the friction disc and rings of a brake. The use of a spring in the brake-actuating mechanism makes possible the efficient varying of the force applied by the solenoid.

It will be understood that the modifications and variations may be effected without departing from the scope of the present invention as defined by the appended claims.

What is claimed is:

1. In a brake of the type wherein a disc that is keyed to a motor shaft is disposed between friction members that are movable axially of said shaft to couple the disc to a stationary member of a support structure, the improvement which comprises a solenoid supported from said structure, and an actuating mechanism having pressure means engageable with one of said friction members and a lever connected to the plunger of said solenoid, energization of said solenoid being effective to move said plunger and said actuating mechanism in a direction to apply force to said pressure means whereby said one friction member is pressed against said disc to lock said disc between said friction members, said support structure including a transverse stationary plate pivotally mounting said lever, a second lever pivoted on said plate and carrying said pressure means, and a compression spring between said levers for transmitting motion between said levers.

2. In a brake of the type wherein a disc that is keyed to a motor shaft is disposed between friction members that are movable axially of said shaft to couple the disc to a stationary member of a support structure, the improvement which comprises a solenoid supported from said structure, and an actuating mechanism having pressure means engageable with one of said friction members and a lever connected to the plunger of said solenoid, energization of said solenoid being effective to move said plunger and said actuating mechanism in a direction to apply force to said pressure means whereby said one friction member is pressed against said disc to lock said disc between said friction members, said support structure including a transverse stationary plate pivotally mounting said lever, a second lever pivoted on said plate and carrying said pressure means, a compression spring between said levers for transmitting motion between said levers, a tension spring connected between said plate and said actuating mechanism for resisting the movement of said mechanism and said plunger when said solenoid is energized, and a second compression spring disposed between said second lever and said plate, movement of said first compression spring under the urging of said solenoid being resisted by said second compression spring and said tension spring whereby when said solenoid is deenergized, said second lever will be moved in a direction to move said pressure means away from said one friction member.

* * * * *